United States Patent
Elnajjar et al.

(10) Patent No.: US 9,998,869 B2
(45) Date of Patent: Jun. 12, 2018

(54) DETERMINING VEHICLE LOCATION VIA SIGNAL STRENGTH AND SIGNAL DROP EVENT

(71) Applicant: General Motors LLC, Detroit, MI (US)

(72) Inventors: Hassan Elnajjar, Deaborn, MI (US); Steven P. Schwinke, Plymouth, MI (US); Dwayne A. Crocker, Lake Orion, MI (US); Nathaniel H. Williams, Berkley, MI (US); Aditya S. Kamini, Bloomfield, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 234 days.

(21) Appl. No.: 14/992,446

(22) Filed: Jan. 11, 2016

(65) Prior Publication Data

US 2017/0201860 A1    Jul. 13, 2017

(51) Int. Cl.
*H04W 4/02*     (2018.01)
*H04B 17/318*   (2015.01)
*H04B 17/27*    (2015.01)

(52) U.S. Cl.
CPC ............ *H04W 4/023* (2013.01); *H04B 17/27* (2015.01); *H04B 17/318* (2015.01)

(58) Field of Classification Search
CPC ................................ H04W 4/02; H04W 4/023

USPC ................................ 455/456.1–457; 340/988
See application file for complete search history.

(56) References Cited

U.S. PATENT DOCUMENTS

| | | | | |
|---|---|---|---|---|
| 2014/0028477 A1* | 1/2014 | Michalske | ............ | G08G 1/005 340/990 |
| 2016/0003949 A1* | 1/2016 | Venkataraman | ........ | G01S 19/22 342/357.29 |
| 2016/0140824 A1* | 5/2016 | Doyle | .................... | G08B 21/22 340/449 |
| 2017/0137032 A1* | 5/2017 | Wuthnow | ............. | B60W 40/08 |

* cited by examiner

*Primary Examiner* — Kamran Afshar
*Assistant Examiner* — Farideh Madani
(74) *Attorney, Agent, or Firm* — Leydig, Voit & Mayer, Ltd.

(57) ABSTRACT

A method for determining vehicle location via a mobile computing device includes: determining, by an application of the mobile computing device, a first signal strength corresponding to a communications component of a vehicle and a first mobile device location corresponding to the first signal strength; detecting, by the application, a signal drop event corresponding to a loss of the signal corresponding to the communications component of the vehicle; determining, by the application, in response to detecting the signal drop event, the first mobile device location corresponding to the first signal strength as the vehicle location based on the first mobile device location being the most recent location at which a recorded signal strength was at a highest level; and providing, by the application, a notification indicating the vehicle location to a user of the mobile device.

18 Claims, 4 Drawing Sheets

DETERMINING VEHICLE LOCATION VIA SIGNAL STRENGTH AND SIGNAL DROP EVENT

BACKGROUND

Mobile computing devices such as smartphones and tablets have greatly increased in popularity over recent years. A variety of mobile applications (or "apps") are available to mobile computing device users to provide a variety of different functions.

Additionally, with respect to mobile vehicles, telematics units within telematics-equipped vehicles provide subscribers with connectivity to a telematics service provider (TSP). The TSP provides subscribers with an array of telematics services including, for example, call handling, stolen vehicle recovery, emergency notifications, diagnostics monitoring, infotainment services, and satellite-based navigation services. For many of these telematics services, the telematics unit communicates with servers of a TSP call center over a wireless network. The telematics unit may also communicate with satellites of a satellite communications network, as well as mobile devices via wireless cellular networks and/or short-range wireless protocols.

SUMMARY

In an exemplary implementation, the invention provides a method for determining vehicle location via a mobile computing device. The method includes: determining, by an application of the mobile computing device, a first signal strength corresponding to a communications component of a vehicle and a first mobile device location corresponding to the first signal strength; detecting, by the application, a signal drop event corresponding to a loss of the signal corresponding to the communications component of the vehicle; determining, by the application, in response to detecting the signal drop event, the first mobile device location corresponding to the first signal strength as the vehicle location based on the first mobile device location being the most recent location at which a recorded signal strength was at a highest level; and providing, by the application, a notification indicating the vehicle location to a user of the mobile device.

In another exemplary implementation, the invention provides a non-transitory, computer-readable memory having processor-executable instructions stored thereon, the processor-executable instructions, when executed by a processor, being configured to carry out a method for determining vehicle location via a mobile computing device. The method includes: determining a first signal strength corresponding to a communications component of a vehicle and a first mobile device location corresponding to the first signal strength; detecting a signal drop event corresponding to a loss of the signal corresponding to the communications component of the vehicle; determining, in response to detecting the signal drop event, the first mobile device location corresponding to the first signal strength as the vehicle location based on the first mobile device location being the most recent location at which a recorded signal strength was at a highest level; and providing a notification indicating the vehicle location to a user of the mobile device.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
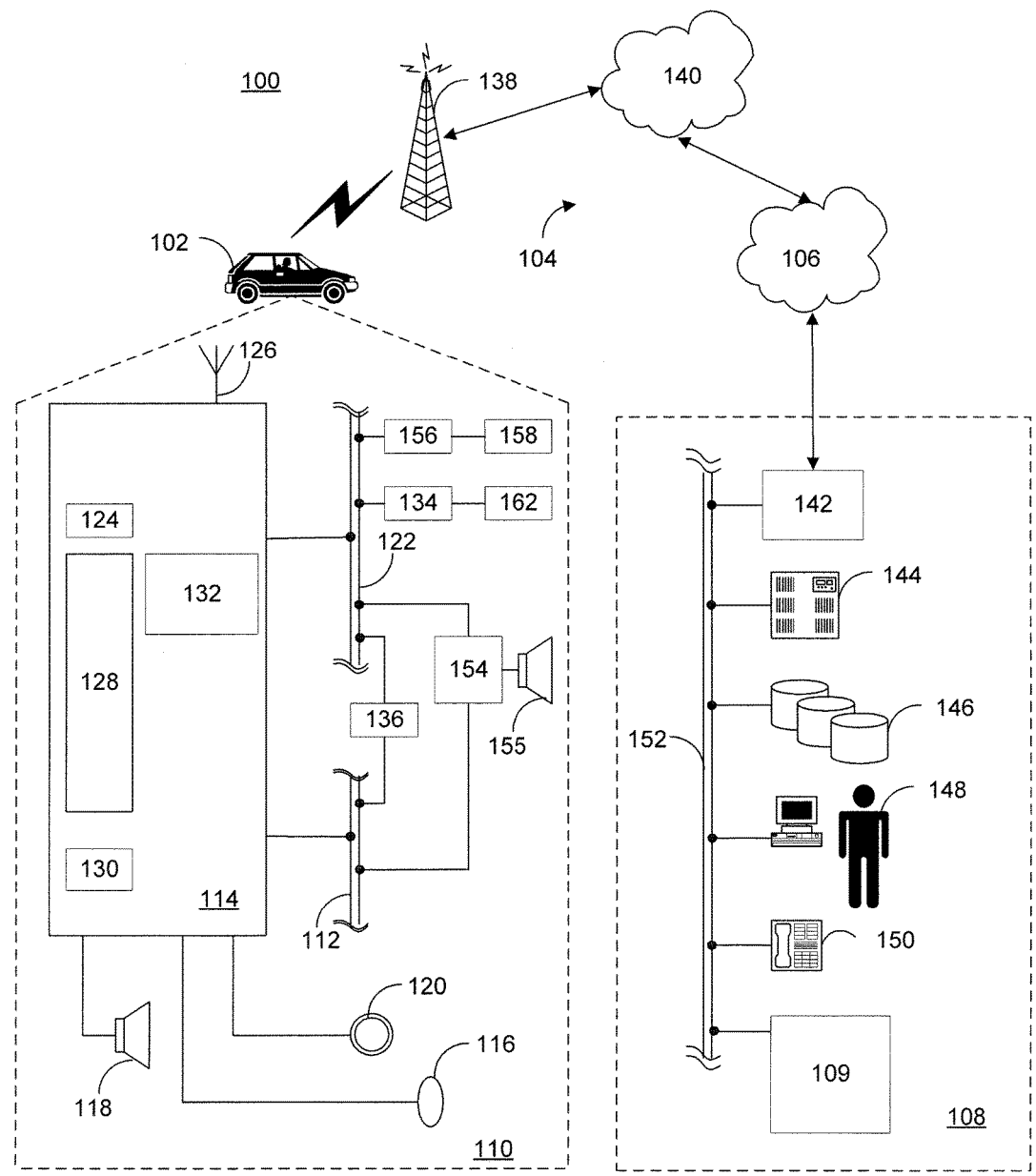
FIG. 1 is a schematic diagram of an operating environment for a mobile vehicle communication system usable in exemplary implementations of the described principles.

Implementations of the invention provide system configurations and methods by which a mobile device (e.g., a smartphone) is able to determine the location of the vehicle without relying on vehicle sub-systems, and without relying on the location-determination functionalities of a vehicle's telematics unit (e.g., a satellite receiver of the telematics unit), in a manner that is seamless to the user of the mobile device. Although in certain implementations, the mobile device may rely on signals provided by components of a telematics unit of a telematics-equipped vehicle, it will be appreciated that, in other implementations, the mobile device may perform the processes described herein with respect to vehicles that do not have a telematics unit installed. In implementations involving vehicles that are not telematics-equipped, the mobile device utilizes any wireless communication protocol that the vehicle is compatible with (for example, Bluetooth (BT), Bluetooth Low Energy (BLE), Wi-Fi, etc.).

In an exemplary implementation, an app on the mobile device keeps track of a signal strength corresponding to the vehicle—for example, a received signal strength indicator (RSSI) indicating the power present in a radio signal, wherein the RSSI is determined based on the power level of a signal received by a receiver (e.g., an antenna) of the mobile device. While the user is in the vehicle (or proximate to the vehicle), for example, while the vehicle is being operated with the user inside or the user remains near the vehicle, the RSSI corresponding to the vehicle as determined by the user's mobile device remains at a high level. In situations where the user of the mobile device turns the vehicle ignition off and exits the vehicle, the RSSI corresponding to the vehicle as determined by the user's mobile device decreases rapidly as the user moves away from the vehicle with the mobile device. In exemplary implementations of the invention, the location of the mobile device is recorded at one or more RSSI ranges relative to the vehicle. Once the vehicle shuts down the communication channel with the mobile device or once the vehicle is out of range from the mobile device, the signal is dropped, and the signal drop event triggers the mobile device app to determine the location of the vehicle as being a most recent location of the mobile device corresponding to the strongest RSSI range location. Thus, even if the vehicle does not communicate to the mobile device the location of the ignition off event, the mobile device is able to trace back its own previous locations to determine where the ignition off event occurred by determining the most recent location where the RSSI signal strength was at a highest level.

It will thus be appreciated that the mobile device does not need any vehicle-specific information (for example, location of the vehicle, ignition status of the vehicle, etc.) and the mobile device is still able to determine the location of the vehicle. This provides for advantages with respect to air time costs and allows for vehicle location determination even when GPS signal is not available for the vehicle (for example, when the vehicle is underground or in a garage), when the vehicle is in an area with no wireless coverage, or when the vehicle does not have location-determination capabilities (e.g., a vehicle that is not telematics-equipped).

An exemplary computing and network communications environment involving a telematics-equipped vehicle is described with reference to FIG. 1, which is a schematic diagram of an operating environment for a mobile vehicle communication system usable in exemplary implementations of the described principles. It will be appreciated that the described environment is an example, and does not imply any limitation regarding the use of other environments to practice the invention.

FIG. 1 depicts an exemplary communication system 100 that may be used with exemplary implementations of the invention, the communication system 100 including a vehicle 102, a mobile wireless network system 104, a land network 106 and a communications center 108. In accordance with an illustrative example, the communication center 108 includes a Global Navigation Satellite System (GNSS) control center 109 incorporating functional components facilitating over-the-air configuration of GNSS receivers integrated with/within telematics units such as a telematics unit 114.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via wireless communications (e.g., over a cellular wireless network). The vehicle 102 includes hardware 110 such as, for example, the telematics unit 114, a microphone 116, a speaker(s) 118 and buttons and/or controls 120, which may be integrated with or separate from the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), a local area network (LAN), an Ethernet, and other appropriate connections such as those that conform with known ISO, SAE, and IEEE standards and specifications.

The telematics unit 114 provides a variety of telematics-related services through communications with the communications center 108 (or "call center"). The telematics unit 114 includes a processor 128, memory 130, a mobile wireless component 124 including a mobile wireless chipset, a dual function antenna 126 (both GNSS and mobile wireless signals), and a GNSS component 132 including a GNSS chipset. The memory 130 comprises computer program(s) and/or set(s) of computer-executable instruction sets/routines that are transferred to, and executed by, the processing device 128. In one example, the mobile wireless component 124 comprises an additional memory having stored thereon other computer program(s) and/or set(s) of computer-executable instruction sets/routines that are executed by the processing device 128. The mobile wireless component 124 constitutes a network access device (NAD) of the telematics unit 114.

The telematics-related services may also be provided via the communications center 108 in combination with applications executed on a mobile device, such as a smartphone, or, alternatively, via communications between the telematics unit 114 and a mobile device that do not involve the communications center 108.

The telematics-related services include an extensive and extendable set of services. Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. For example, other service include but are not limited to: vehicle door unlocking, diagnostic monitoring, firmware/software updating, emergency or theft-related services, etc. Moreover, the telematics unit 114 may include a number of known components in addition to those explicitly described above.

The telematics unit 114 may establish a communications channel with the mobile wireless network system 104, for example using radio-based transmissions, so that both voice and data signals can be sent and received via the communications channel. In one example, the mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component 132.

The microphone 116 provides the driver or other vehicle occupant with a way to input verbal or other auditory commands, and can be equipped with an embedded voice processing unit utilizing human/machine interface (HMI) technology. The speaker(s) 118 provides verbal output to the vehicle occupants and can be either a stand-alone speaker specifically dedicated for use with the telematics unit 114 or can be part of an audio component 154. In either case, the microphone 116 and the speaker(s) 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114. In certain implementations, the buttons and/or controls 120 may include a touchscreen which acts both as a display and as an input interface.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of or in combination with the infotainment center 136. The audio component 154 may contain an additional speaker system 155, or may utilize the speaker(s) 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control.

The wireless network system 104 is, for example, a cellular telephone network system or any other suitable wireless system that transmits signals between mobile wireless devices, such as the telematics unit 114 of the vehicle 102, and may further include land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. For example, the MSCs 140 may include remote data servers.

As appreciated by those skilled in the art, the mobile wireless network system includes various cell tower/base station/MSC arrangements. For example, a base station and a cell tower could be located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, wireless networks such as wireless local networks (WLANs) or networks providing broadband wireless access (BWA), or any combination thereof.

The communications center 108 is configured to provide a variety of back-end services and application functionality relating to the vehicle hardware 110. The communications center 108 includes, by way of example, network switches 142, servers 144, databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which may be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a maimed version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by computing devices (such as the telematics unit, communications center equipment, and other computing devices) may be carried out according to stored instructions and/or applications installed thereon.

Figure 2:
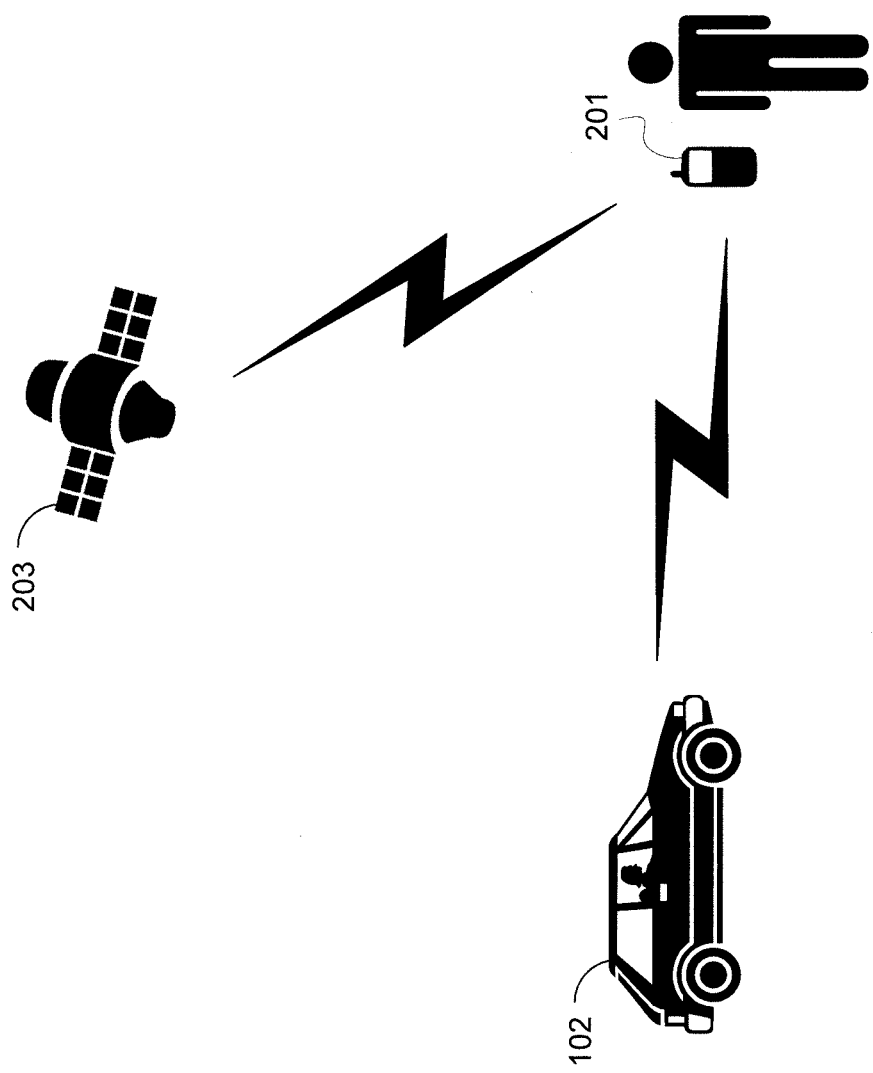
FIG. 2 is a schematic diagram of a general operating environment usable in exemplary implementations of the described principles.

Although FIG. 1 depicts an exemplary environment involving a telematics-equipped vehicle, it will further be appreciated that implementations of the invention may also be used with respect to vehicles that are not telematics-equipped. FIG. 2 is a schematic diagram of a general operating environment usable in exemplary implementations of the described principles. The operating environment includes the vehicle 102, a user's mobile device 201, and a satellite positioning system (represented by a satellite 203). In an exemplary implementation, the user's mobile device 201 is configured to execute, via a processor and a memory, various mobile applications, including mobile applications that utilize communication hardware of the user's mobile device to communicate with communications hardware of the vehicle 201 via short-range wireless protocols such as Bluetooth, BLE or Zigbee, as well as wireless local area network (WLAN) protocols such as Wi-Fi, or other communications protocols (e.g., via a cellular wireless network). The mobile device 201 is also able to determine its own position using satellite-based positioning signals (e.g., GPS signals) from the satellite positioning system 203 and/or other position-determination mechanisms, including for example, dead-reckoning navigation, triangulation based on communications with base stations or WLAN access points, and/or short-range wireless communications with other computing devices.

Exemplary implementations of the invention utilize the environment of FIG. 2 to determine the location of the vehicle without relying on vehicle sub-systems, and without relying on the location-determination functionalities of a vehicle's telematics unit (e.g., a satellite receiver of the telematics unit), in a manner that is seamless to the user of the mobile device. In other words, in a situation where the vehicle ignition is off, the user is able to find out the last known location of his or her vehicle via the mobile device, based on the mobile device determining the last known location of the vehicle based on a signal strength indicator corresponding to the vehicle. In an implementation, this is accomplished by tracing back recorded data pairs of mobile device position and signal strength indicator to find a most recent mobile device position corresponding to a strongest level of signal strength indicator after detecting a signal drop event (e.g., due to the communications hardware of the vehicle being turned off or the signal strength (e.g., RSSI) being so weak as to indicate that the vehicle is now out of range of the mobile device).

Figure 3:
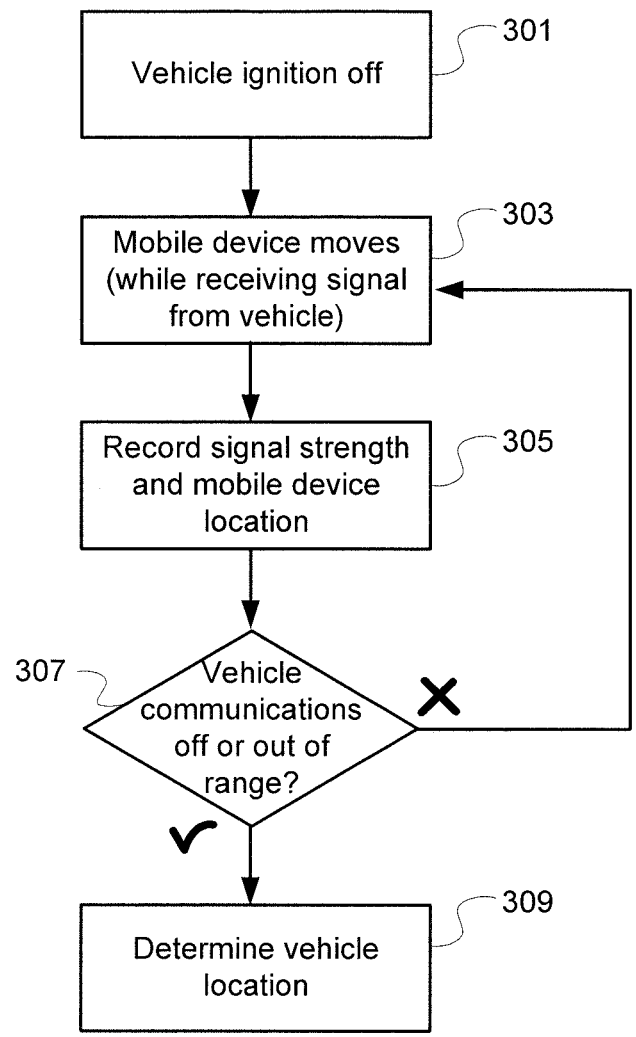
FIG. 3 is a flowchart illustrating an exemplary process for determining a last vehicle location based on a recorded signal strength.

FIG. 3 is a flowchart illustrating an exemplary process for determining a last vehicle location based on a recorded signal strength. At stage 301, the vehicle ignition is turned off while communications hardware of the vehicle remains on (for example, a wireless communications component of the vehicle such as a NAD may remain on in a standby mode or discontinuous receive (DRx) mode) for a period of time after the vehicle ignition is turned off. While the vehicle ignition is off, the mobile device moves away from the vehicle and telematics unit at stage 303, while still receiving a radiofrequency signal from the vehicle based upon which the mobile device is able to determine a signal strength corresponding to the vehicle (e.g., an RSSI).

At stage 305, the mobile device records the signal strength corresponding to the vehicle and associates the recorded signal strength to an independently determined mobile device location. For example, for a first signal strength (e.g., RSSI) value R1, the mobile device determines that the location of the mobile device is at position P1 (corresponding to coordinates X1 and Y1 obtained from a satellite navigation component of the mobile device such as a global positioning system (GPS) unit of the mobile device). In exemplary implementations, stage 305 may be performed periodically or may be triggered based on the signal strength corresponding to the vehicle meeting a certain condition, for example, being within a certain range or falling below a certain threshold. Additionally, stage 305 may be repeated multiple times for multiple conditions (e.g., at multiple ranges or due to the signal strength falling below multiple consecutive thresholds), until the condition of stage 307 of the vehicle being turned off or being out of range is met. In other words, FIG. 3 shows that, as the mobile device continues to move away from the vehicle (stage 303), the signal strength (and associated mobile device location) may be recorded one or more times (stage 305) until the condition of stage 307 is met.

The condition of stage 307 is set so as to provide a clear indication that the user is away from the vehicle or that the communications hardware of the vehicle is off. Once the condition of stage 307 is met, corresponding to a signal drop event—e.g., due to the communications hardware of the vehicle being turned off or the signal strength (e.g., RSSI) being so weak as to indicate that the vehicle is now out of range or far away—the mobile device determines the vehicle location at stage 309. The location is determined as a most recent location of the mobile device associated with the strongest signal strength (e.g., RSSI) corresponding to the vehicle.

After the location of the vehicle is determined, a user of the mobile device may be notified of the vehicle location (e.g., via a display of the mobile device). The location of the vehicle may also be communicated to other users and/or devices.

Figure 4:
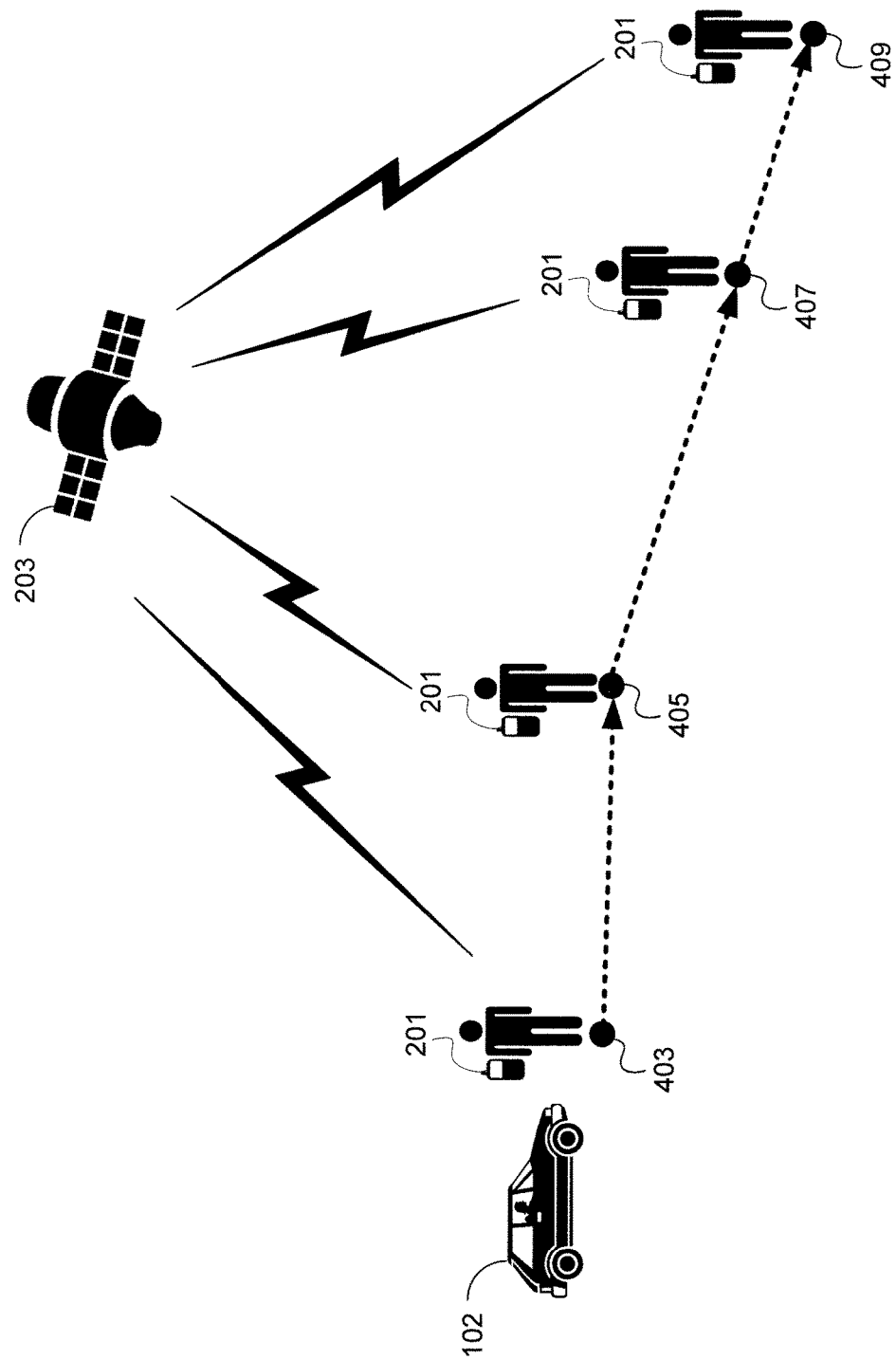
FIG. 4 is a diagram illustrating an exemplary process for determining a last vehicle location based on a recorded signal strength.

FIG. 4 is a diagram illustrating an exemplary process for determining a last vehicle location based on a recorded signal strength. In FIG. 4, the mobile device 201 is shown moving away from the vehicle, from location 403 to location 405 to location 407 to location 409.

Location 403 corresponds to the location at which the mobile device 201 determines that the signal strength (e.g., RSSI) corresponding to the vehicle fulfills a first condition (e.g., the signal strength is in a first range or is above a first threshold, indicating that the mobile device 201 is in the immediate vicinity of the vehicle, for example, within 1-2 meters of the vehicle). Based on the mobile device 201 determining that the signal strength (e.g., RSSI) fulfills the first condition, the mobile device 201 records a position P1 (e.g., obtained from the satellite system 203) corresponding to the first condition or first signal strength R1 (the signal strength R1 may, for example, be a signal strength value or a signal strength level corresponding to a range of values), as indicated in Table 1 below.

Location 405 corresponds to the location at which the mobile device 201 determines that the signal strength (e.g., RSSI) corresponding to the vehicle fulfills a second condition (e.g., the signal strength is in a second range or falls below a threshold, indicating that the mobile device 201 is near the vehicle but no longer in the immediate vicinity of the vehicle, for example, at a distance of approximately 10 meters of the vehicle). Based on the mobile device 201 determining that the signal strength fulfills the second condition, the mobile device 201 records a position P2 (e.g., obtained from the satellite system 203) corresponding to the second condition or second signal strength R2, as indicated in Table 1 below.

Location 407 corresponds to the location at which the mobile device 201 determines that the signal strength (e.g., RSSI) corresponding to the vehicle fulfills a third condition (e.g., the signal strength is in a third range or falls below another threshold, indicating that the mobile device 201 is farther from the vehicle, for example, at a distance of approximately 30 meters of the vehicle). Based on the mobile device 201 determining that the signal strength fulfills the third condition, the mobile device 201 records a position P3 (e.g., obtained from the satellite system 203) corresponding to the third condition or third signal strength R3, as indicated in Table 1 below.

Location 409 corresponds to the location at which the mobile device 201 determines that a signal drop condition has been met (e.g., due to the communications hardware of the vehicle being turned off or the signal strength (e.g., RSSI) being so weak as to indicate that the vehicle is now out of range (e.g., at a distance of approximately 50 meters or more)). Based on the mobile device 201 determining that the signal drop condition has been met, the mobile device 201 records a position P4 (e.g., obtained from the satellite system 203) corresponding to a zero or low signal strength R4, as indicated in Table 1 below.

In an alternative implementation, the location and signal strength pairs (such as the P2-R2 and P3-R3 pairs) may be recorded periodically rather than being triggered by signal strength conditions or thresholds.

Table 1 provides exemplary correspondences between determined signal strengths (e.g., RSSI) and determined mobile device locations that are stored by the mobile device in an exemplary implementation.

TABLE 1

| Distance from Vehicle | Signal Strength (e.g., RSSI) | Mobile Device Location |
|---|---|---|
| Immediate vicinity (e.g., ~1 m) | R1 | P1 |
| Near but not immediate (e.g., ~10 m) | R2 | P2 |
| Far from vehicle (e.g., ~30 m) | R3 | P3 |
| Out of range (e.g., ~50 m+) | R4 | P4 |

In the foregoing example, the first signal strength R1, which is determined in the immediate vicinity of the vehicle, will be the highest signal strength. R2, R3, and R4, which correspond to signal strengths at greater distances away from the vehicle, will all be lower than R1. The mobile device location P1 corresponding to R1 is thus determined by the mobile device as being the most recent vehicle location.

It will be appreciated that, in other exemplary implementations, the determined mobile device locations may be associated with parameters or labels other than the determined signal strength (e.g., by associating the mobile device location with a respective condition that was met, or with a label corresponding to the respective signal strength such as "immediate," "near," "far," and "out of range").

It will also be appreciated that, although the example of FIG. 4 is discussed above with respect to three points at which the location of the mobile device is recorded in addition to the signal drop event, other exemplary implementations may include any number of signal strengths (R1 to RN) and mobile device locations (P1 to PN) being recorded (where N is a positive integer).

Additionally, it is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for determining vehicle location via a mobile computing device, the method comprising:
   determining, by an application of the mobile computing device, a first signal strength corresponding to a communications component of a vehicle and a first mobile device location of the mobile computing device corresponding to the first signal strength;
   determining, by the application, a second signal strength corresponding to the communications component of the vehicle and a second mobile device location of the mobile computing device corresponding to the second signal strength, wherein the second mobile device location is farther away from the vehicle than the first mobile device location and the second signal strength is lower than the first signal strength;
   detecting, by the application, a signal drop event corresponding to a loss of the signal corresponding to the communications component of the vehicle, wherein the signal drop event corresponds to a third mobile device location that is farther away from the vehicle than the second mobile device location;
   selecting, by the application, in response to detecting the signal drop event, the first mobile device location as the vehicle location based on the first signal strength corresponding to the first mobile device location being greater than the second signal strength corresponding to the second mobile device location; and
   providing, by the application, a notification indicating the vehicle location to a user of the mobile computing device.

2. The method according to claim 1, further comprising:
   determining, by the application, the third mobile device location corresponding to the signal drop event.

3. The method according to claim 1, further comprising:
   determining, by the application, that the first signal strength meets a first signal strength condition;
   wherein determining the first mobile device location corresponding to the first signal strength is in response to determining that the first signal strength meets the first signal strength condition.

4. The method according to claim 3, wherein the first signal strength condition comprises the first signal strength being within a range of signal strength values.

5. The method according to claim 1, further comprising:
   determining, by the application, that the first signal strength meets a first signal strength condition; and
   determining, by the application, that the second signal strength meets a second signal strength condition;
   wherein determining the first mobile device location corresponding to the first signal strength is in response to determining that the first signal strength meets the first signal strength condition; and
   wherein determining the second mobile device location corresponding to the second signal strength is in response to determining that the second signal strength meets the second signal strength condition.

6. The method according to claim 5, wherein the first signal strength condition comprises the first signal strength being within a first range of signal strength values and the second signal strength condition comprises the second signal strength being within a second range of signal strength values.

7. The method according to claim 1, wherein determining the first mobile device location is based on satellite-positioning signals received by the mobile computing device.

8. The method according to claim 1, wherein detecting the signal drop event corresponding to the loss of the signal corresponding to the communications component of the vehicle comprises determining that a signal strength corresponding to the communications component of the vehicle is below a signal drop threshold.

9. The method according to claim 1, wherein the communications component of the vehicle is part of a telematics unit of the vehicle.

10. A non-transitory, computer-readable memory having processor-executable instructions stored thereon, the processor-executable instructions, when executed by a processor, being configured to carry out a method for determining vehicle location via a mobile computing device, the method comprising:
    determining a first signal strength corresponding to a communications component of a vehicle and a first mobile device location of the mobile computing device corresponding to the first signal strength;
    determining a second signal strength corresponding to the communications component of the vehicle and a second mobile device location of the mobile computing device corresponding to the second signal strength, wherein the second mobile device location is farther away from the vehicle than the first mobile device location and the second signal strength is lower than the first signal strength;
    detecting a signal drop event corresponding to a loss of the signal corresponding to the communications component of the vehicle, wherein the signal drop event corresponds to a third mobile device location that is farther away from the vehicle than the second mobile device location;
    selecting, in response to detecting the signal drop event, the first mobile device location as the vehicle location based on the first signal strength corresponding to the first mobile device location being greater than the second signal strength corresponding to the second mobile device location; and
    providing a notification indicating the vehicle location to a user of the mobile computing device.

11. The non-transitory, computer-readable medium according to claim 10, wherein the method further comprises:
    determining the third mobile device location corresponding to the signal drop event.

12. The non-transitory, computer-readable medium according to claim 10, wherein the method further comprises:
    determining that the first signal strength meets a first signal strength condition;
    wherein determining the first mobile device location corresponding to the first signal strength is in response to determining that the first signal strength meets the first signal strength condition.

13. The non-transitory, computer-readable medium according to claim 12, wherein the first signal strength condition comprises the first signal strength being within a range of signal strength values.

14. The non-transitory, computer-readable medium according to claim 10, wherein the method further comprises:
    determining that the first signal strength meets a first signal strength condition; and
    determining that the second signal strength meets a second signal strength condition;
    wherein determining the first mobile device location corresponding to the first signal strength is in response to determining that the first signal strength meets the first signal strength condition; and
    wherein determining the second mobile device location corresponding to the second signal strength is in response to determining that the second signal strength meets the second signal strength condition.

15. The non-transitory, computer-readable medium according to claim 14, wherein the first signal strength condition comprises the first signal strength being within a first range of signal strength values and the second signal strength condition comprises the second signal strength being within a second range of signal strength values.

16. The non-transitory, computer-readable medium according to claim 10, wherein determining the first mobile device location is based on satellite-positioning signals received by the mobile computing device.

17. The non-transitory, computer-readable medium according to claim 10, wherein detecting the signal drop event corresponding to the loss of the signal corresponding to the communications component of the vehicle comprises determining that a signal strength corresponding to the communications component of the vehicle is below a signal drop threshold.

18. The non-transitory, computer-readable medium according to claim 10, wherein the communications component of the vehicle is part of a telematics unit of the vehicle.

* * * * *